S. N. STEPHENSON.
HORSESHOE AND SWAGE.
No. 171,588.                    Patented Dec. 28, 1875.
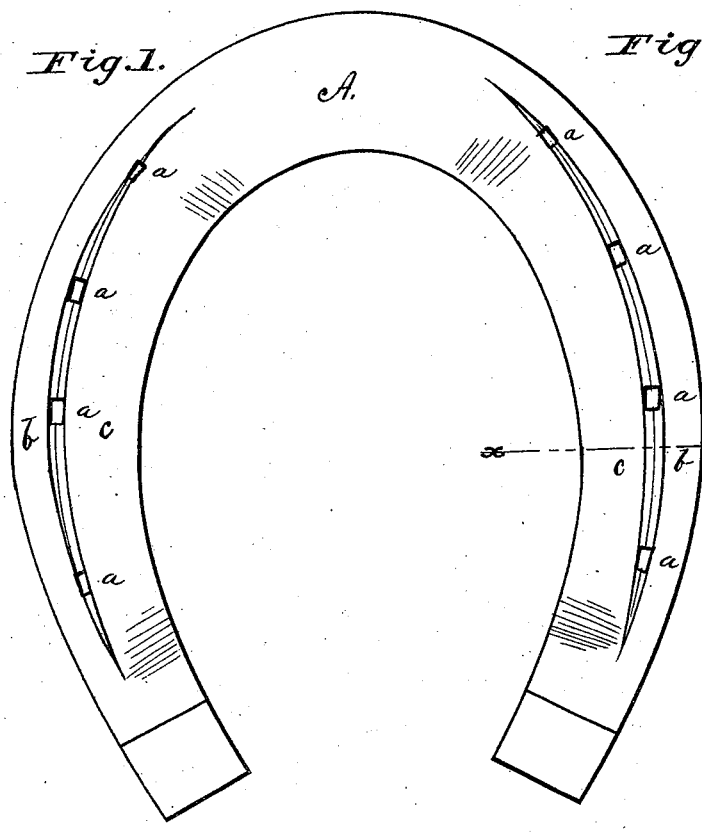
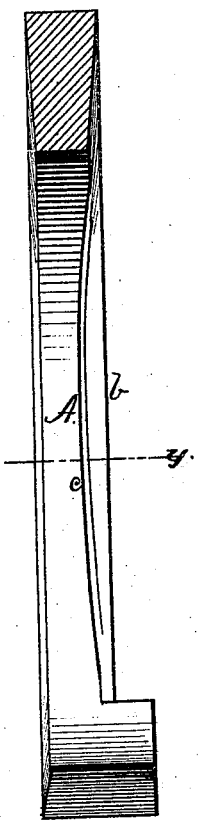
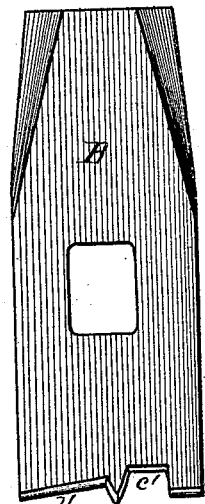
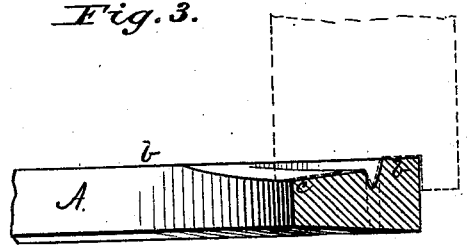
Attest:
William Jackson.
W. T. Hutchinson
Inventor:
Squire Newton Stephenson
by C. M. Parks,
attorney.

UNITED STATES PATENT OFFICE

SQUIRE N. STEPHENSON, OF RICHMOND, TENNESSEE.

IMPROVEMENT IN HORSESHOES AND SWAGES.

Specification forming part of Letters Patent No. 171,588, dated December 28, 1875; application filed August 5, 1875.

*To all whom it may concern:*

Be it known that I, SQUIRE NEWTON STEPHENSON, of Richmond, Bedford county, and State of Tennessee, have invented a Horseshoe and Swage; and I do hereby declare the following to be a full and correct description of the same, reference being had to the accompanying drawings, in which—

Figure 1 is a plan view; Fig. 2, a side view; Fig. 3, a cross-section, and Fig. 4 a view of the swage.

The object of my invention is, first, to construct a horseshoe so that the weight of the horse in traveling will be thrown upon the outer edge of the shoe, and the outer edge of the hoof will be the more supported by the shoe; and, secondly, forming the face of the shoe by means of a swage; and my invention consists in making the face of the horseshoe concave, leaving a large proportion of the iron of which the shoe is made on the outside, and thinning down the inside of the shoe below the plane of the outside, all of which being done by means of a swage construction, in the manner hereinbefore described.

In the drawings, A represents the horseshoe, and B the swage. In the shoe the calks are placed in their usual places; but the holes $a$ for the nails are much farther back from the edge than in the ordinary shoe. The part of the shoe between the nail-holes $a$ and the outer edge is all in the same plane as shown at $b$ in Fig. 3; but the part between the nail-holes and the inner edge is much below the part $b$, and is inclined inward, as seen at $c$. This form of the face of the horseshoe throws the weight of the horse at the proper place, being the outer edge of the shoe, which should touch the ground first, in order to give the horse ease and comfort in traveling on any kind of road.

By this construction there is fully three times as much iron on the outside of the nail-hole groove as there is in the ordinary shoe. This gives more room for opening the shoe, and enables the smith to make the shoe extend out full around the outer edge of the hoof, and lets the outer edge of the hoof rest on the outer edge of the shoe, which is as it should be, as the outer edge of the hoof is the hardest part, and by this arrangement the nail-holes are removed farther from the outer edge of the shoe, which will permit the nails to be driven straight through the hoof instead of in a bowing condition, and thereby the clinch can be driven down in a much more solid manner.

In the face of the swage B is a groove, $c'$, which corresponds with the part of the shoe $b$; also a ridge for forming the nail-hole groove, and an inclined part, $b'$, corresponding to the inclined part $c$ of the shoe.

The above-described surface upon the shoe is formed by means of the swage in the following manner: Place the swage on the shoe-blank, and by moving it around the outer edge it raises the outer edge, and cuts the groove, and makes the concave in the shoe all at the same time.

The shoe can be made as above described within the same time, and with as little labor, as the ordinary shoe.

Having thus fully described my invention, what I claim, and desire to secure by Letters Patent, is—

1. A horseshoe, having the edge $b$ outside of the nail-groove thicker and heavier than the edge $c$ inside said groove, by reason of an inclination and depression on the face toward the inner edge, substantially as described.

2. The horseshoe-swage B, having the groove $c'$, the ridge for forming the nail-hole groove, and the inclined part $b'$, substantially as and for the purpose described.

The above specification of my said invention signed and witnessed at Shelbyville, Tennessee, this 2d day of August, A. D. 1875.

SQUIRE NEWTON STEPHENSON.

Witnesses:
   R. P. FRIERSON,
   HERNICE S. COOPER.